United States Patent [19]

Fucito et al.

[11] Patent Number: 4,642,583
[45] Date of Patent: Feb. 10, 1987

[54] NOISE REDUCTION IN COMPANDING ARRANGEMENTS

[75] Inventors: Dermot T. Fucito, Norcross; James E. Paul; Milan Markovic, both of Stone Mountain, all of Ga.

[73] Assignee: Northern Telecom Limited, Montreal, Canada

[21] Appl. No.: 683,577

[22] Filed: Dec. 19, 1984

[51] Int. Cl.$^4$ .............................................. H04B 1/64
[52] U.S. Cl. ......................................... 333/14; 333/16; 455/72
[58] Field of Search ............................. 333/14, 15, 16; 381/106, 104, 94; 455/72; 330/51, 52, 144, 149, 151, 126

[56] References Cited

U.S. PATENT DOCUMENTS

| | | | |
|---|---|---|---|
| 2,986,712 | 5/1961 | Hochrath | 333/14 |
| 3,510,793 | 5/1970 | Barber | 330/52 |
| 3,895,322 | 7/1975 | Stewart et al. | 333/14 |
| 4,253,072 | 2/1981 | Fisher et al. | 333/14 |
| 4,337,440 | 6/1982 | de Korte | 330/51 X |
| 4,498,060 | 2/1985 | Dolby | 381/106 X |

Primary Examiner—Eugene R. LaRoche
Assistant Examiner—Benny Lee
Attorney, Agent, or Firm—Schwartz, Jeffery, Schwaab, Mack, Blumenthal & Evans

[57] ABSTRACT

In a companding arrangement, the presence of a tone in only one of the two transmission directions is detected. Upon such detection, for example during set-up of a telephone call via a satellite transmission channel, the tone is compressed or expanded, depending on its transmission direction, separately from the remainder of the signal using a second compander. Companding is thus effected using two companders operating at different amplitude levels, with a consequent noise level reduction. A single bandpass filter is used to separate the detected tone, switches being controlled by the tone detection to couple the bandpass filter selectively for operation in either transmission direction.

7 Claims, 1 Drawing Figure

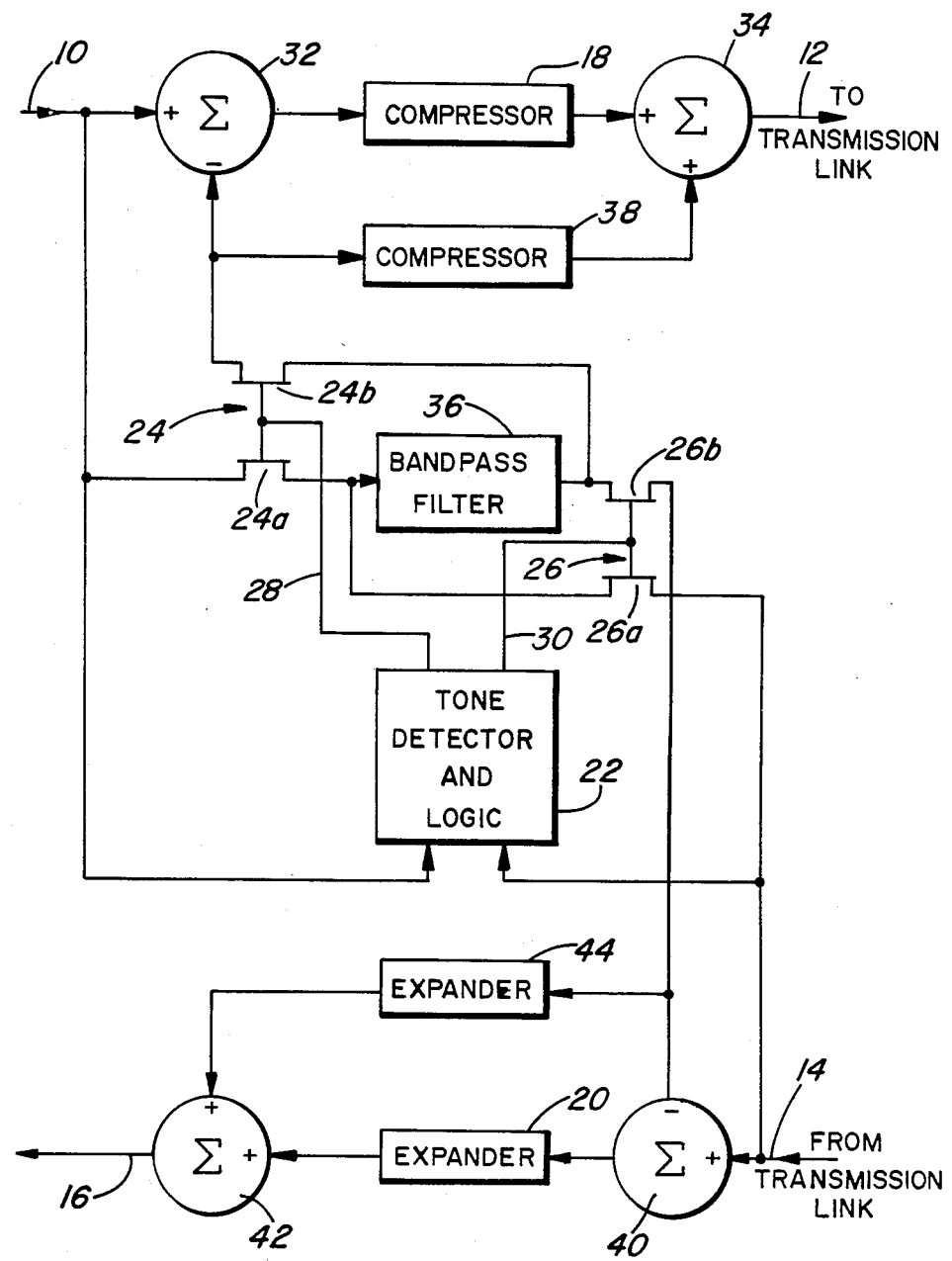

NOISE REDUCTION IN COMPANDING ARRANGEMENTS

BACKGROUND OF THE INVENTION

1. Field of the Invention

This invention relates to companding arrangements, in which the signal-to-noise ratio of signals transmitted via a transmission channel is enhanced by compressing the amplitudes of the signals prior to transmission and expanding the amplitudes of the signals received from the channel.

2. Related Art

It is well known to provide a companding arrangement for the transmission of telephone signals, in particular for transmission of such signals via satellite transmission channels. A significant problem arises in such arrangements during telephone call set-up, when a 2600 Hz SF (single frequency) tone is transmitted via the channel. The presence of this tone on the channel causes the gain of the expander at the receiving end of the transmission channel to adopt a higher level than would be the case in the absence of this tone. Consequently, noise picked up on the channel at other frequencies is not properly reduced. As a result, the call originator is subjected to a relatively high noise level during call set-up.

SUMMARY OF THE INVENTION

An object of this invention is to provide an improved companding arrangement in which this disadvantage is reduced.

According to this invention there is provided a companding arrangement comprising: first and second compressors each for compressing signals for transmission in a first direction via a transmission link; first and second expanders each for expanding signals received in a second direction via the transmission link; filter means having a predetermined pass band; detection means for detecting a frequency in said pass band in signals in each of said directions; and switching means responsive to the detection means detecting such a frequency in only one of said directions for connecting the filter means in a path in such one direction, whereby signals in said one direction outside said pass band are compressed by the first compressor or expanded by the first expander, and signals in said one direction in said pass band are compressed by the second compressor or expanded by the second expander.

In such an arrangement, a signal at a frequency in the pass band of the filter means in only one of the two directions of transmission is subjected to compression or expansion by the second compressor or expander, whereas signals in this direction at other frequencies are compressed or expanded by the first compressor or expander. By selecting the pass band of the filter to include the standard 2600 Hz SF tone frequency, the problem described above is avoided in that the SF tone is companded by the second compressor and expander at the ends of the transmission link, whereas noise at other frequencies is substantially suppressed in that companding at other frequencies is effected by the first compressor and expander, having a different gain during call set-up, at the ends of the transmission link.

When a frequency in the filter pass band is not present in either direction of transmission, or is present in both transmission directions, then the switching means does not connect the filter means in the above manner, and the second compressor and the second expander have no effect, the companding arrangement operating in a conventional manner.

In a preferred embodiment of the invention the switching means comprises:

first switching means for selectively connecting a transmit path, for signals for compression and transmission via the transmission link, via the filter means to an input of the second compressor, and means for subtracting from signals on said transmit path signals applied to the input of the second compressor and applying the resultant signals to an input of the first compressor; and second switching means for selectively connecting a receive path, for signals received via the transmission link and for expansion, via the filter means to an input of the second expander, and means for subtracting from signals on said receive path signals applied to the input of the second expander and applying the resultant signals to an input of the first expander.

Preferably the filter means comprises a bandpass filter having a center frequency of substantially 2600 Hz.

BRIEF DESCRIPTION OF THE DRAWING

The invention will be further understood from the following description with reference to the accompanying drawing, which illustrates, in a block diagram, a companding arrangement in accordance with an embodiment of the invention.

DETAILED DESCRIPTION OF THE PREFERRED EMBODIMENT

The companding arrangement shown in the drawing serves to compress signals, such as signals of a telephone channel, on a transmit path 10 for transmission in a first direction via a line 12 leading to the transmission link, such as a satellite transmission channel. In the opposite direction of transmission, the arrangement serves to expand signals received from the transmission link on a receive path 14 and to supply the expanded signals on a line 16. To this end the arrangement includes a compressor 18 coupled between the path 10 and the line 12, and a first expander 20 coupled between the path 14 and the line 16. The functions of the compressor 18 and expander 20 are to compress and expand signal amplitudes and are well known in the art and need not be described here.

The transmit path 10 and the receive path 14 are coupled to inputs of a tone detector and logic circuit 22, which operates in the manner described below to control first and second pairs of FET (field-effect transistor) switches 24 and 26, each of which pairs comprises a first switch 24a or 26a and a second switch 24b or 26b. The circuit 22 serves to detect a 2600 Hz SF tone occurring on the transmit path 10 and the receive path 14. If it detects such a tone occurring on only the transmit path 10, it supplies a signal on a line 28 to close the switches 24a and 24b, the switches 26a and 26b being open. If it detects such a tone occurring on only the receive path 14, it supplies a signal on a line 30 to close the switches 26a and 26b the switches 24a and 24b being open. If it detects the tone on both the transmit path 10 and the receive path 14, or if it does not detect the tone, the circuit produces no signal on the line 28 or 30 so that both pairs of switches are open.

The transmit path 10 is coupled to the input of the first compressor 18 via a summing circuit 32, and the output of the compressor 18 is coupled to the line 12 via a summing circuit 34. When the switches 24a and 24b are simultaneously closed, they couple the transmit path 10 via a bandpass filter 36 to an inverting (subtractive) input of the summing circuit 32 and also to an input of a second compressor 38, whose output is connected to a second input of the summing circuit 34. Similarly, the receive path 14 is coupled to the input of the first expander 20 via a summing circuit 40, and the output of the expander 20 is coupled to the line 16 via a summing circuit 42. When the switches 26a and 26b are simultaneously closed, they couple the receive path 14 via the filter 36 to an inverting (subtractive) input of the summing circuit 40 and also to an input of a second expander 44, whose output is connected to a second input of the summing circuit 42.

The second compressor 38 and the second expander 44 are conveniently parts of a single compander integrated circuit device, such as Signetics type NE570N. The summing circuits are conveniently constituted by differential amplifiers. The bandpass filter 36 has a narrow pass band centered at the 2600 Hz SF tone frequency. The tone detector and logic circuit 22 conveniently comprises a single tone detector whose operation is multiplexed to detect the 2600 Hz tone alternately on the transmit path 10 and the receive path 14, with logic circuitry dependent upon such detection to produce the switch control signals on the lines 28 and 30. Alternatively, the circuit 22 can comprise two separate tone detectors, having inputs connected respectively to the transmit path 10 and the the receive path 14, and logic gates responsive to the outputs of such detectors to produce the switch control signals on the lines 28 and 30.

In operation of the companding arrangement, when no 2600 Hz tone is detected on either of the paths 10 and 14 by the circuit 22, or when such a tone is detected on both paths, all of the switches are open and the filter 36, compressor 38, and expander 44 have no effect. In this case companding by the first compressor 18 and the first expander 20 takes place in the same manner as in the prior art.

If a 2600 Hz SF tone is detected on the transmit path 10 but not on the receive path 14, as described above the switches 24a and 24b are closed so that the filter 36 has its input connected to the transmit path 10 via the switch 24a and its output connected to the summing circuit 32 and the second compressor 38 via the switch 24b. The 2600 Hz tone passes through the filter 36 so that it is subtracted from the signal on the transmit path 10 by the summing circuit 32, and the resultant signal is compressed at its own amplitude level by the compressor 18. The 2600 Hz tone from the output of the filter 36 is separately compressed at its different amplitude level by the second compressor 38. The separately compressed frequency bands are combined by the summing circuit 34 for transmission via the line 12 and the transmission link.

In the compander at the other end of the transmission link, the 2600 Hz SF tone is in this case detected on the receive path 14 but not on the transmit path 10. Consequently the switches 26a and 26b are closed so that the filter 36 has its input connected to the receive path 14 via the switch 26a and its output connected to the summing circuit 40 and the second expander 44 via the switch 26b. The 2600 Hz tone passes through the filter 36 so that it is subtracted from the signal on the receive path 14 by the summing circuit 40, and the resultant signal is expanded at its own amplitude level by the second expander 44, and the separately expanded frequency bands are combined by the summing circuit 42.

Thus the companding arrangement detects when a 2600 Hz SF tone is present in only one direction of transmission, such as occurs during set-up of a telephone call, and upon such detection compands this separately so that the noise problem referred to above is substantially avoided.

Numerous modifications, variations, and adaptations may be made to the particular embodiment of the invention described above without departing from the scope of the invention as defined in the claims.

What is claimed is:

1. A companding arrangement comprising:
    first input means for inputting signals to the companding arrangement in a first direction;
    second input means for inputting signals to the companding arrangement in a second direction opposite the first direction;
    first and second compressors each for compressing signals for transmission in the first direction via a transmission link;
    first and second expanders each for expanding signals received in the second direction via said transmission link;
    filter means having a predetermined pass band;
    detection means connected to said first and second input means for detecting a frequency inside of the pass band in signals in each of the first and second directions; and
    switching means responsive to said detection means detecting such a frequency in the first direction for connecting an input of said filter means to said input means for inputting signals in the first direction whereby signals in the first direction outside the pass band bypass said filter means and are fed to said first compressor and whereby signals in the second direction outside the pass band bypass said filter means and are fed to said first expander; and whereby signals in said first direction inside the pass band are passed through said filter means and fed to said second compressor and whereby signals in said second direction inside the pass band are passed through said filter means and fed to said second expander.

2. A companding arrangement as claimed in claim 1 wherein said switching means comprises:
    first switching means for selectively connecting said first input means via said filter means to an input of said second compressor, and means for generating signals by subtracting from signals of said first input means, filtered signals applied to an input of said second compressor and applying said generated signals to an input of said first compressor; and
    second switching means for selectively connecting said second input means via said filter means to an input of said second expander, and means for generating signals by subtracting from signals of said second input means, filtered signals applied to an input of said second expander and applying said generated signals to an input of said first expander.

3. A companding arrangement as claimed in claim 2 wherein each of said first and second switching means comprises a first switch coupled between an input of said filter means and one of the respective input means, and a second switch coupled between an output of said filter means and the input of the respective second compressor or expander.

4. A companding arrangement as claimed in claim 3 and including means for summing outputs of said first and second compressors and means for summing outputs of said first and second expanders.

5. A companding arrangement as claimed in claim 2 wherein said detection means comprises means for detecting a frequency of substantially 2600 Hz on each of said transmit and receive paths.

6. A companding arrangement as claimed in claim 2 wherein said filter means comprises a bandpass filter having a center frequency of substantially 2600 Hz.

7. A companding arrangement as claimed in claim 8 wherein said frequency in the pass band is substantially 2600 Hz.

* * * * *